United States Patent [19]
Stafford et al.

[11] Patent Number: 5,763,118
[45] Date of Patent: Jun. 9, 1998

[54] BATTERY SYSTEM WITH A HIGH-THERMAL-CONDUCTIVITY SPLIT SHELL STRUCTURAL SUPPORT

[75] Inventors: John P. Stafford, Yorba Linda; Walter Rex Oswald, Redondo Beach; Susan K. Ferer, Rancho Palos Verdes; Matt H. Russell, Glendora; Patrick B. Cooke, Lakewood; Michael Langmack, Huntington Beach; Robert K. Taenaka, Granada Hills, all of Calif.

[73] Assignee: Hughes Aircraft Company, Los Angeles, Calif.

[21] Appl. No.: 644,013

[22] Filed: May 9, 1996

[51] Int. Cl.⁶ .................................................. H01M 2/00
[52] U.S. Cl. .................................. 429/163; 429/167
[58] Field of Search ........................ 429/96, 98, 99, 429/100, 163, 164, 167, 176

[56] References Cited

U.S. PATENT DOCUMENTS

| | | |
|---|---|---|
| 3,669,744 | 6/1972 | Tsenter et al. . |
| 4,000,350 | 12/1976 | Wittmann . |
| 4,250,235 | 2/1981 | Dupont et al. . |
| 4,262,061 | 4/1981 | Rogers . |
| 4,283,844 | 8/1981 | Milden et al. . |
| 4,369,212 | 1/1983 | Rogers et al. . |
| 4,683,178 | 7/1987 | Stadnick et al. . |
| 5,310,141 | 5/1994 | Homer et al. . |

FOREIGN PATENT DOCUMENTS

| | | |
|---|---|---|
| 0 704 919 A1 | 4/1996 | European Pat. Off. . |
| 2 694 658 A1 | 2/1994 | France . |
| WO 94 11908 A1 | 5/1994 | WIPO . |

OTHER PUBLICATIONS

Peck, S. O., et al.; "High Thermal Conductivity Graphite in Space Applications;" *American Inst. of Aeronautics and Astronautics;* Preprint AIAA-95-1474-CP; pp. 2931-2938; (1995) (Month N/A).

V. C. Mueller, "Nickel-Hydrogen Battery Integration Study For the Multimission Modular Spacecraft", Proceedings of the 15th Intersociety Energy Conversion Engineering Conference, vol. 3, No. 3, Aug. 1980, pp. 1901-1907.

D. Paugman et al., "Qualification Of The French Nickel-Hydrogen Battery And Its Application To The Artemis Satellite", IEEE-Aerospace Power, Conversion Technology, Electrochemical Conversion, vol. 1, 8 Aug. 1993, pp. 1101-1105.

*Primary Examiner*—M. Nuzzolillo
*Attorney, Agent, or Firm*—Elizabeth E. Leitereg; Terje Gudmestad; Wanda K. Denson-Low

[57] ABSTRACT

A battery system includes a battery cell having a battery cell housing, and a housing support external to the battery cell housing. The housing support is formed of at least two split shell segments. Each split shell segment includes a heat conductor inner layer having a plurality of heat-conducting fibers with heat sink ends, and a structural support outer layer overlying the heat conductor inner layer. The structural support layer is made of a fiber-reinforced composite material. A layer of a structural adhesive bonds the respective heat conductor inner layer of each split shell segment to the battery cell housing. A thermal sink is in thermal contact with the sink ends of the plurality of heat-conducting fibers of each of the split shell segments, and the structural support outer layer of each split shell segment is joined to a structural base. Preferably, a number of the battery cells and overlying housing supports extend between a single thermal sink at one end and a single structure base at the other end, forming a battery pack.

17 Claims, 4 Drawing Sheets

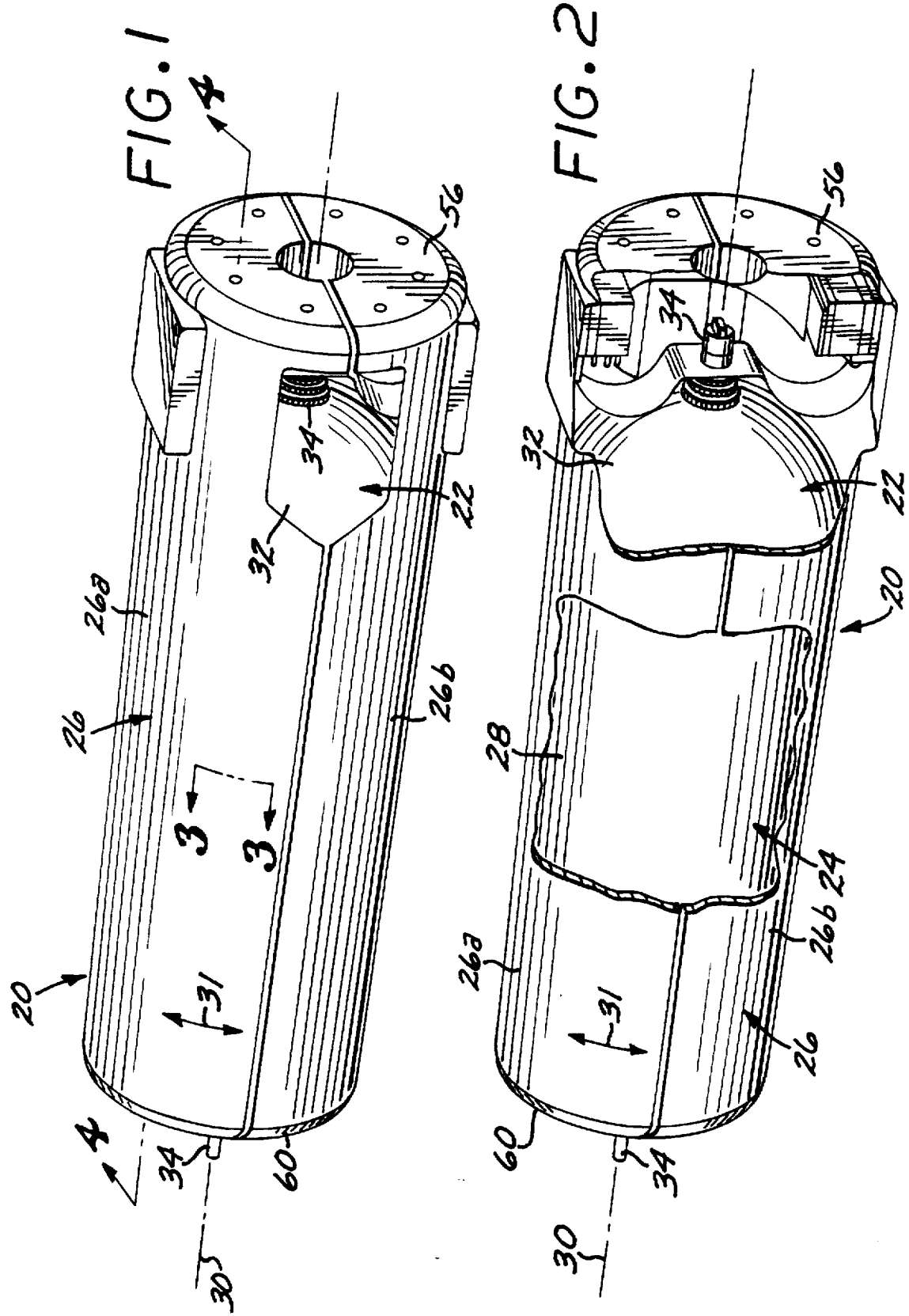

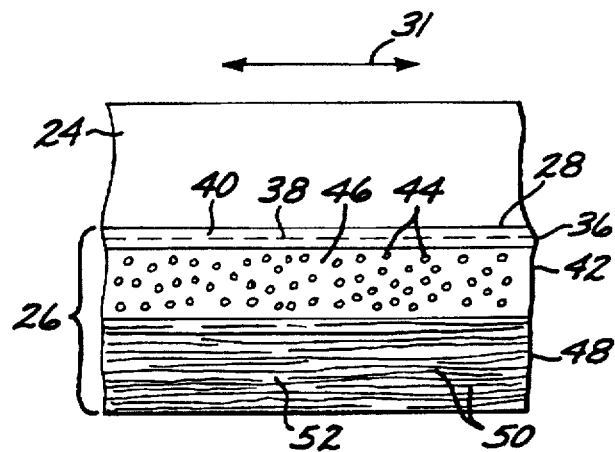
FIG.3
FIG.4
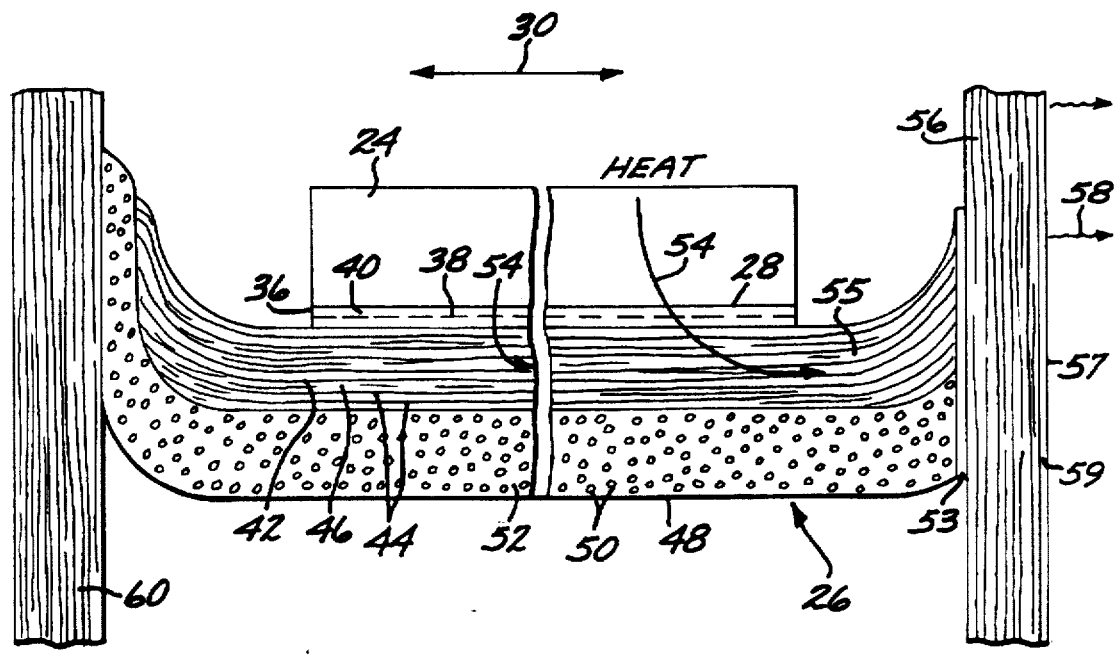

BATTERY SYSTEM WITH A HIGH-THERMAL-CONDUCTIVITY SPLIT SHELL STRUCTURAL SUPPORT

BACKGROUND OF THE INVENTION

This invention relates to battery systems of the type used in spacecraft, and, more particularly, to a cylindrical battery cell and its thermal/structural support.

Spacecraft such as communications and other types of satellites carry onboard power-generation systems and batteries to store the generated power for peak-consumption situations and for use when the power-generation system has reduced power output. For example, an earth-orbiting communications satellite with solar cells for the production of electricity has batteries to provide power when the solar cells are in shade or oriented in relation to the sun in such as manner that the power output is below that required to operate the satellite.

The batteries, which are made of a number of individual battery cells, are part of a battery system which includes structural support and thermal management for the batteries, and an electrical control and distribution system. The present invention deals with the structural support and thermal management of the batteries. Although the batteries are weightless in space, they must be properly supported for the loadings and vibrations that are experienced during the testing, transportation, and launching, and the internal pressure produced within the battery cell during operation must be structurally contained. When the batteries are used in space, the chemical reactions occurring during the charging/discharging cycle produce heat. The batteries must be supported in such a manner that the batteries are not damaged by structural loadings and vibrations, and also such that the internal heat produced within the battery cells is conducted away to a heat sink so that the cells are not heated above their operating limits.

Several approaches are known for the structural support and thermal management of the batteries. Most commonly, the battery cells are bonded to an aluminum thermal flange that is connected to the spacecraft radiator, which serves as the heat sink. The cells and thermal flanges are mechanically supported on aluminum shelves. In recent developments, composite materials have been used to form the thermal flanges and also used in cylindrical split shells to support the batteries. Even though aluminum is a low-density metal, the fabrication of the thermal flanges from composite materials reduces the weight of the structure even further. The weight of the spacecraft is a critical concern, as the cost of launching the spacecraft runs to the thousands of dollars per pound. The composite approaches previously proposed reduce the weight, but do not achieve a minimal weight and acceptable mechanical performance by integrating thermal and structural components.

There is a need for a battery system having satisfactory structural support for the battery cell and also good heat removal. Such a battery system has direct application in spacecraft, but also in other battery applications as well.

SUMMARY OF THE INVENTION

The present invention provides a battery system utilizing a composite battery cell housing support that achieves excellent structural support of the battery cell and multiple battery cells supported together as a battery pack. The battery cell housing support also achieves high heat-removal efficiency from the battery cell. These benefits are realized with greatly reduced weight as compared with prior approaches. Structural support and thermal management parameters are selectable to achieve the optimum respective properties, without resorting to property compromises that result in sub-optimal performance.

In accordance with the invention, a battery system comprises a battery cell having a battery cell housing, and a housing support external to the battery cell housing. The housing support comprises at least two split shell segments. Each split shell segment includes a heat-conductor inner layer comprising a plurality of heat-conducting fibers, with each of the heat-conducting fibers having a sink end thereof, and a structural support outer layer overlying the heat conductor inner layer. The structural support layer is made of a fiber-reinforced composite material. A layer of a structural adhesive bonds the respective heat-conductor inner layer of each split shell segment to the battery cell housing. A thermal sink is in thermal contact with the sink ends of the plurality of heat-conducting fibers of each of the split shell segments. Preferably, the thermal sink is located at one end of the battery cell, and a structural base to which the structural support layer is joined is disposed at the other end of the battery cell.

The heat-conducting fibers are preferably high-thermal-conductivity graphite. These heat-conducting fibers preferentially conduct the heat produced in the battery cell to the heat sink. They provide some longitudinal stiffness to the battery system, but are not the principal structural supports. The structural support layer is preferably made of a high-strength graphite-fiber-reinforced polymeric matrix, applied to an intermediate mandrel by an off-axis winding or layup operation that produces controllable circumferential and axial components to the strength that may be selected for particular applications.

The battery cell housing is preferably in the form of an elongated cylinder with the electrochemical electrodes within the housing. In accordance with this aspect of the invention, a battery system comprises a battery cell having a generally cylindrical battery cell housing with a cylindrical axis and a cylindrical external surface. There is a housing support external to the cylindrical housing. The housing support comprises at least two split shell segments. Each of the segments includes a heat conductor inner layer comprising a plurality of heat-conducting fibers aligned substantially parallel to the cylindrical axis of the battery cell housing, with each of the heat-conducting fibers being made of high-thermal-conductivity graphite and having a sink end thereof. A structural support outer layer overlies the plurality of heat-conducting fibers. The structural support outer layer is made of a graphite fiber-reinforced composite material. A layer of a structural adhesive bonds the heat conductor inner layer of each split shell segment to the battery cell housing. A thermal sink is in thermal contact with the sink ends of the plurality of heat-conducting fibers, the thermal sink being disposed at a first end of the battery cell housing.

It is not uncommon that a communications satellite will employ a large number of battery cells, typically 24–60 battery cells in current communications satellites, to provide the required battery system output and storage capacity. The multiple battery cells are arranged together in battery packs of convenient size. For example, one satellite system requires 32 battery cells, arranged in four battery packs of eight battery cells each. The present invention may be used with such battery packs of battery cells, to even greater advantage than achieved in conjunction with single battery cells.

In accordance with this aspect of the invention, a battery system comprises a plurality of battery cells, each of the battery cells having a battery cell housing. There is a respective housing support external to and overlying each battery cell housing, with each housing support comprising at least two split shell segments. Each split shell segment includes a heat conductor inner layer comprising a plurality of heat-conducting fibers, and each of the heat-conducting fibers has a sink end thereof. There is a structural support outer layer overlying the heat conductor inner layer, wherein the structural support layer is made of a fiber-reinforced composite material. A layer of a structural adhesive bonds the heat conductor inner layer of each respective split shell segment to its battery cell housing. A thermal sink is in thermal contact with the sink ends of the plurality of heat-conducting fibers, and a structural base is joined to the structural support outer layer.

In such a battery pack having a plurality of battery cells, the individual support housings and their respective battery cell housings extend between the thermal sink and the structural base to impart a high rigidity to the structure that resists deformation. Consequently, separate load-bearing supports extending between the thermal sink and the structural base are not required in the overall support structure of the battery pack, permitting the weight of the support structure of the battery pack to be reduced.

The mounting approach of the invention provides great flexibility in selecting the orientation of the battery cells within the battery pack, as well as the interconnect wiring leading between the battery cells. The ability to select these design parameters within the scope of the mounting structure allows the spacecraft designer to control to some extent the dipole moment of the battery pack and thence the dipole moment of the spacecraft.

The battery system of the invention provides a significant improvement in achieving the required structural support and thermal dissipation required in a spacecraft, with reduced weight. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a perspective view of a battery cell and its thermal/structural support;

FIG. 2 is a perspective view like that of FIG. 1, with a portion of one end of the thermal/structural support broken away to illustrate the battery cell;

FIG. 3 is an enlarged sectional view of the battery system of FIG. 1, taken along lines 3—3 of FIG. 1;

FIG. 4 is an enlarged sectional view of the battery system of FIG. 1, taken along lines 4—4 of FIG. 1;

DETAILED DESCRIPTION OF THE INVENTION

Figure 5:
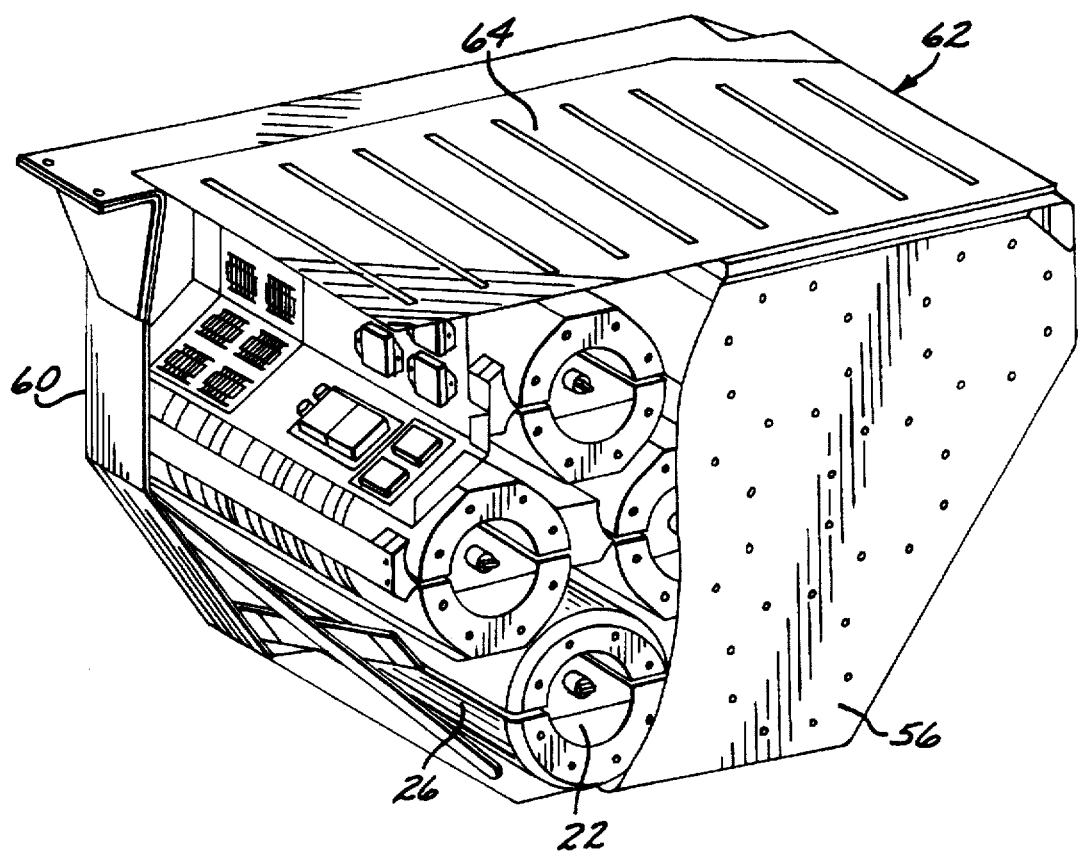
FIG. 5 is a perspective view of a battery pack utilizing multiple battery cells, with a portion of the structural base and the side walls removed to illustrate the interior of the battery system.

FIGS. 1 and 2 illustrate a battery system 20 including a battery cell 22, which is preferably a nickel-hydrogen battery cell. The battery cell 22 has a battery cell housing 24 made of a metal such as the nickel-base alloy Inconel, and a housing support 26 external to the battery cell housing 24. The battery cell housing 24 includes a generally cylindrical surface 28 with a cylindrical axis 30 and an orthogonal circumferential direction 31, and oppositely disposed domed ends 32 joined to the cylindrical surface 28. This cylindrical configuration is preferred, but the present invention is not limited to such a shape and is more broadly applicable. Electrical contacts 34 of opposite polarity extend from the two domed ends 32. The external and internal structures of the battery cell 22 (but not those of the support housing 26) are known in the art and are described, for example, in U.S. Pat. No. 4,683,178; 4,369,212; 4,283,844; 4,262,061; 4,250, 235; 4,000,350; and 3,669,744, whose disclosures are incorporated by reference. The present invention is not concerned with the internal structural details of the battery cell 22 or its operation.

The housing support 26 is formed of at least two, and preferably exactly two, split shell segments 26a and 26b. The split shell segments 26a and 26b may be visualized as being formed by slicing the generally cylindrical housing support 26 with a plane in which the cylindrical axis 30 lies. The two split shell segments 26a and 26b, when contacted to the cylindrical surface 28 of the battery cell 22, together act as the housing support 26.

FIGS. 3 and 4 illustrate sections through the battery system 20, with FIG. 3 taken perpendicular to the cylindrical axis 30 and FIG. 4 taken perpendicular to the circumferential direction 31. FIGS. 3 and 4 are not drawn to scale.

The housing support 26 (and thence the two split shell segments 26a and 26b that form it) overlies and contacts the cylindrical surface 28 on the outside of the battery cell 22. Lying immediately adjacent to the cylindrical surface 28 of the battery cell housing 24 is an adhesive layer 36. The principal function of the adhesive layer 36 is to bond the overlying structure of the housing support 26 to the battery cell housing 24. The adhesive layer 36 also acts as an electrical insulator. The electrodes and electrical conductors within the battery cell 22 are isolated from the walls of the battery cell housing 24, but the adhesive layer 36 is provided to externally isolate the battery cell housing 24 to prevent the battery cell 22 from shorting during assembly, test, transportation, and launch.

The adhesive layer 36 is preferably made as a three-sublayer structure comprising a scrim cloth 38 with a film of adhesive 40 on either side of the scrim cloth 38. The scrim cloth 38 is preferably made of woven glass fibers and the adhesive is preferably an epoxy. Suitable adhesive layered structures 36 are available commercially as Ablefilm from Ablestik, Rancho Dominguez Hills, Calif. using 3M type EC2216 epoxy. The Ablefilm material is supplied in a frozen form that is thawed for application and use. The adhesive layer 36 is typically from about 0.007 to about 0.015 inches thick.

A heat-conductor inner layer 42 overlies and contacts the electrically insulative adhesive layer 36. The heat-conductor inner layer 42 comprises heat-conducting fibers 44 oriented generally parallel to the cylindrical axis 30. The heat conducting fibers 44 may be oriented away from the cylindrical axis 30 by about 10 degrees or more, yet still accomplish their heat-conducting function satisfactorily. An orientation of less than about 10 degrees is preferred, however, to achieve the best heat-conduction performance. The heat-conducting fibers 44 are preferably made of a high-thermal-conductivity graphite material of the type known in the art. As used herein, such a "high-thermal-conductivity fiber"

must have a thermal conductivity of greater than 160 Watts/meter-° K This definition is selected because the thermal conductivity of the high-thermal conductivity fiber is to be greater than that of conventional aluminum alloys used in aerospace applications, which is about 160 Watts/meter-° K. Such a high-thermal-conductivity graphite material is commercially available as XN70A material from Nippon Graphite or P100 material from Amoco. The thermal conductivity of such fibers is about 193 Watts/meter-° K, well above that of aluminum alloys. The fibers 44 are embedded in a polymeric matrix 46, such as, for example, an epoxy, but the polymeric matrix is not limited to this material. The fibers 44 are preferably present in as high a volume fraction of the heat-conductor layer 42 as possible, in order to achieve a high thermal flow through the layer. In a preferred embodiment, the fibers 44 are present in a volume fraction of 60 volume percent of the heat-conductor inner layer 42. The heat-conductor layer 42 is preferably a minimum of 0.040 inches thick, but can be thicker as desired. Excessive thicknesses add unnecessary weight. As a practical matter, a preferred maximum thickness of the heat-conductor inner layer 42 is about 0.060 inches.

A structural support outer layer 48 overlies and contacts the heat-conductor inner layer 42. The structural support outer layer 48 is a composite material, preferably comprising structural fibers 50 embedded in a polymeric matrix 52. The structural fibers 50 are preferably, but not necessarily, made of a high-strength graphite material. (The structural fibers 50 can be the same material as the heat-conducting fibers 44, if they are both strong and of high thermal conductivity.) Such a high-strength graphite material is commercially available as M40J fiber from Toray of Tokyo, Japan or IM7 fiber from Hercules. The polymeric matrix 52 is preferably an epoxy, but the polymeric matrix is not limited to this material. The volume fraction of the fibers 50 in the matrix 52 is selected to produce mechanical properties desired for the particular battery system. In a presently preferred approach, the fibers 50 are present in the matrix 52 in an amount of about 60 volume percent. The structural support layer 48 is preferably a minimum of 0.020 inches thick, but can be thicker as desired. Excessive thicknesses add unnecessary weight. As a practical matter, a preferred maximum thickness of the structural support outer layer 48 is about 0.040 inches.

The structural fibers 50 are illustrated in FIGS. 3 and 4 as extending generally parallel to the circumferential direction 31 so as to provide a high hoop strength to the structural support outer layer 48, the preferred approach. The structural fibers 50 may also be oriented at an angle intermediate between the circumferential direction 31 and the axial direction 30, such as at about ±45 degrees to the cylindrical axis 30, as required to produce selected stiffness and strength properties for the housing support 26. In a preferred manufacturing approach, the structural fibers 50 are applied by filament winding, so that they are oriented intermediate between the circumferential direction 31 and the axial direction 30.

The heat-conducting fibers 44 of the heat-conductor inner layer 42 conduct heat from the wall of the battery cell housing 24 and parallel to the cylindrical axis 30, as indicated by heat flow arrows 54 in FIG. 4. The heat flows toward a sink end 55 of the heat-conducting fibers 44, which are joined to a thermal sink 56 that is preferably located at one end of the cylindrical housing 24 and the housing support 26. The thermal sink 56 has a radiating surface 57 on the side remote from the heat-conducting fibers 44, so that heat flowing to the thermal sink 56 is radiated away into space, as indicated by the radiation arrows 58. Preferably, a metallic layer 59 is positioned on the thermal sink 56 at its radiating surface 57, to serve as a portion of the Faraday shield surrounding the battery cells and other spacecraft components.

The thermal sink 56 may be made of any suitable material. It is preferably made of a fiber-composite material of the same type as the structural support outer layer 48, although it could be made of other types of fiber-composite material such as the fiber-composite material of the heat-conductor layer 42. The sink end 55 of the heat-conducting fibers 44 is generously faired and joined to the thermal sink 56 by any appropriate technique which has a relatively low thermal impedance. The preferred approach is a thermal shim 53 made of a high-thermal-conductivity, low-electrical-conductivity material. The preferred thermal shim 53 is made of a fiber-reinforced elastomer termed CHO-THERM manufactured by Chomerics, Inc. If only high thermal conductivity (but not low electrical conductivity) is required, the thermal shim 53 may be made of grafoil GTA graphite-containing composite material, available from Union Carbide, Cleveland, Ohio, but it could be made of other materials such as copper or aluminum. Bolts (not shown) hold the heat-conductor layer 42 and the structural support outer layer 48 to the thermal sink 56, with the thermal shim 53 therebetween.

A structural base 60, serving as a shear panel, is positioned at an opposite end of the battery cell 22 and housing support 26 from the thermal sink 56. The structural support outer layer 48 is joined to the structural base 60. The structural base 60 may be made of any operable material, but it is preferably made of a composite material, such as the same composite material as the structural support outer layer 48, in order to achieve high strength and low weight. The structural support layer 48 is joined to the structural base 60 by any operable approach, but it is preferably joined with bolts.

The structural base 60 is a structural component designed primarily to carry the weight, torsional, and vibrational forces of the battery system 20. The thermal sink 56, on the other hand, is designed primarily to conduct and radiate heat away. Nevertheless, the structural base 60 can serve to dissipate some heat, and the thermal sink 56 does carry a structural load. Accordingly, the heat-conductor inner layer 42 is faired into and attached to the structural base 60 or to the side of the structural support layer 48 remote from the structural base 60 (as shown in FIG. 4). Similarly, the structural support outer layer 48 is faired into and bolted to the same side of the thermal sink 56 to which the heat-conductor inner layer 42 is bonded.

The relative degrees of thermal conduction and load transfer into the structural base and into the thermal sink may be selectively established during manufacture by varying the nature of the end bonding of the layers in the manner illustrated in FIG. 4. For example, the approach illustrated at the right side of FIG. 4 transfers more load and less heat into the structural base 60, because the mode of bonding of the structural support layer 48 partially insulates the heat-conductor inner layer 42 from the structural base 60. The approach illustrated at the left side of FIG. 4 transfers less load and more heat into the thermal sink 56, because the heat-conductor inner layer 42 extends to the thermal sink 56 and there is a relatively small shear area where the structural support layer 48 bonds to the thermal sink 56. The specific geometry of these bonded connections may be varied to control the relative heat flow and structural loadings transferred into the structural base and the thermal sink, providing the spacecraft designer with great flexibility in design selection.

By separating the functions of the heat-conductor inner layer 42 and the structural support outer layer 48, these layers may be separately optimized. In some prior composite supports for batteries, the heat conduction and structural support functions were combined in a single element, and the design of that element represented a compromise between structural strength and heat conduction. In the present approach, no such compromise is required and the functions of the layers 42 and 48 are separately optimized.

The structural base 60 and thermal sink 56 are illustrated in FIGS. 1-4 for use with a single battery cell 22. As shown in FIG. 5, in most applications multiple battery cells 22 are supported between a single structural base and a single thermal sink. In the battery pack 62 of FIG. 5, eight battery cells 22 and their respective housing supports 26 extend between the structural base 60 and the thermal sink 56. The structure of the elements and their attachments are as described previously in relation to FIGS. 1-4.

The eight battery cells 22 and their respective housing supports 26 serve as nearly rigid structural elements interconnecting the structural base 60 and the thermal sink 56 of the battery pack 62. The battery cells 22 and their housing supports 26 provide deformation resistance in the axial direction 30. Inasmuch as they are laterally displaced from each other in two dimensions, they also impart shear strength to the battery pack 62. Thus, the walls of the battery cells 22 serve to contain the internal pressure within the battery cells. The battery cells 22 and the housing supports 26 also add shear strength to the battery pack. For some applications, separate structural members performing the interconnection of the structural base and the thermal sink and providing shear resistance of the structure are not required, so that the battery pack weight is substantially lower than would otherwise be the case. The side walls 64 provided on the lateral sides of the battery pack 62 serve primarily as curtains to exclude debris from the interior of the battery pack 62 rather than as structural elements. In other applications, the side walls do perform structural functions and may have reinforcing members such as cross straps mounted thereon. The side walls or the ends of the battery pack may be used to mount auxiliary equipment such as switches, relays, wiring, sensors, etc.

Figure 6:
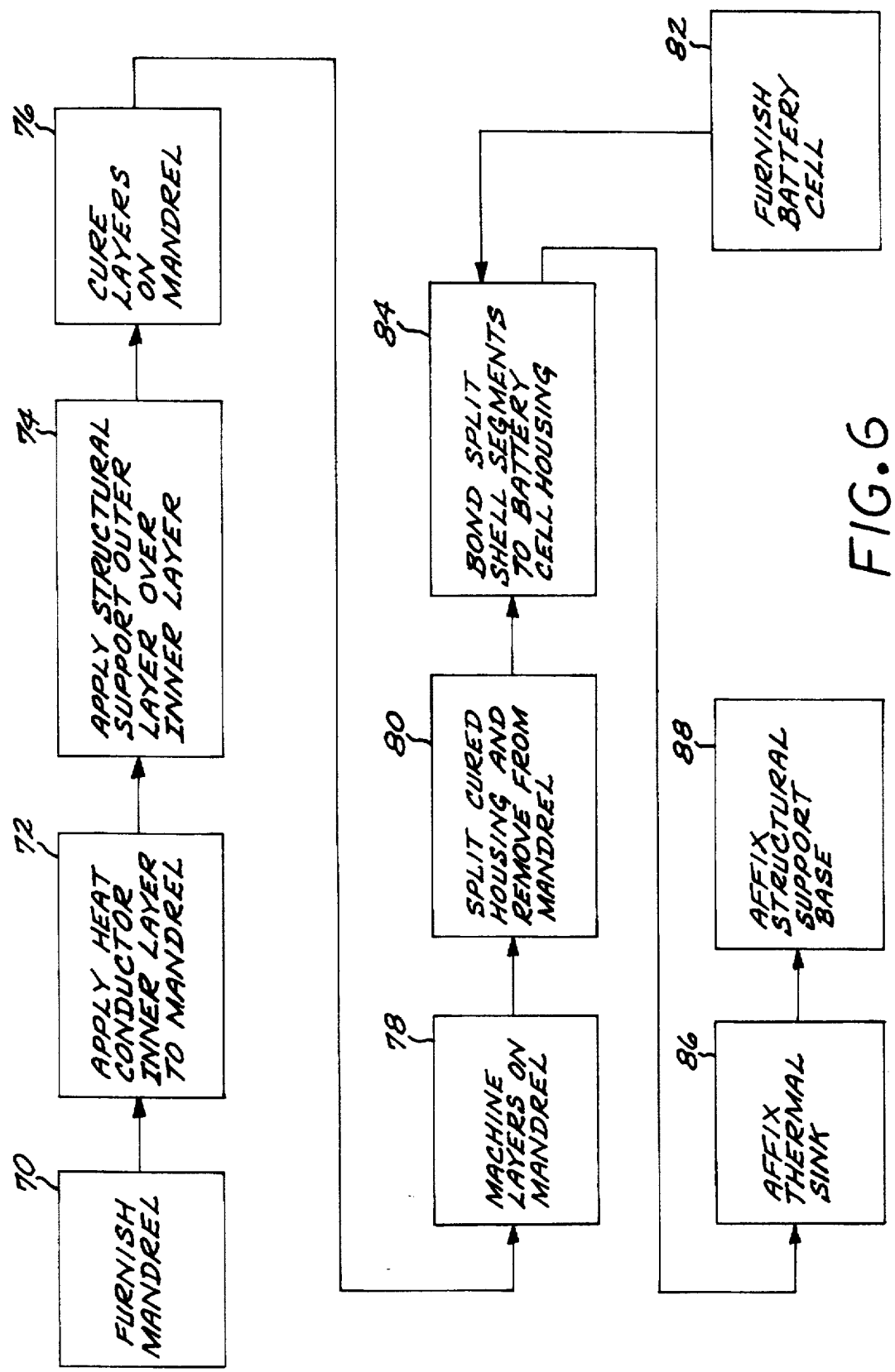
FIG. 6 is a process flow diagram of a process for preparing the battery system.

FIG. 6 illustrates a preferred method for fabricating the preferred battery system of the invention. A cylindrical mandrel having substantially the same cylindrical diameter as the cylindrical surface 28 is furnished, numeral 70.

The heat-conductor inner layer 42 is applied to the cylindrical surface of the mandrel, numeral 72. Because the primary function of the heat-conductor inner layer 42 is to conduct heat from the housing 24 and along the length of the fibers 44 to the thermal sink 56, the fibers 44 are oriented as closely as possible to be parallel to the cylindrical axis of the mandrel, which ultimately results in their being closely parallel to the cylindrical axis 30. However, the fibers 44 need not be aligned perfectly with the cylindrical axis, and deviations of about 10 degrees or more are permitted (but not preferred). The preferred high-thermal-conductivity graphite fibers and polymeric matrix are preferably applied by layup or filament winding in a wet, uncured form.

The structural support outer layer 48 is applied over the heat-conductor layer 42, numeral 74. The details of the fiber orientations in the layer 48 are specific to a particular battery cell design. Generally, however, the fibers are positioned to have a substantial component parallel to the circumferential direction 31 to provide hoop strength, but also a component that is not parallel to the circumferential direction. Crossed plies are typically used to form the structural support outer layer 48 in order to achieve balanced loadings. The structural support outer layer 48 may be applied either by a filament winding technique or a wet layup technique.

The laid-up structure of the heat-conductor inner layer 42 and the structural support outer layer 48 is cured on the mandrel, numeral 76. In the preferred approach, the curing is accomplished at a temperature of about 250° F. for at least about 2 hours. The matrices of the layers 42 and 48 are selected to be compatible with such a common-curing procedure, and this selection is reflected in the preferred materials of construction discussed previously herein. In the curing operation, the layer 48 bonds to the layer 42. The cured structure is machined as necessary for the subsequent assembly steps, numeral 78.

The shell comprising the layers 42 and 48 is split lengthwise by a slice through the cylindrical axis of the mandrel, numeral 80, so that it can be removed from the mandrel. The result is the two split shell segments 26a and 26b. These split shell segments may be lightly machined or deburred as necessary after removal from the mandrel.

The battery cell 22 is prepared using known techniques and furnished, numeral 82. The adhesive material used for the adhesive layer 40 is furnished and used to bond each of the two split shell segments 26a and 26b to the external surface of the battery cell 22, numeral 84. The adhesive layer 40 is cured, typically at ambient temperature for a time of 24 hours.

The steps 70, 72, 74, 76, 78, 80, 82, and 84 are performed for each of the battery cells 22 and housing supports 26, where, as in the embodiment of FIG. 5, a multi-cell battery pack is manufactured.

The thermal sink 56 is supplied and affixed to the heat-conductor layer, numeral 86. The structural base 60 is supplied and affixed to the structural support layer 48, numeral 88.

A battery cell 22 and housing support 26 have been successfully prepared using the approach described here. Based upon the resulting structure, it was estimated that 18 pounds of weight would be saved in an eight-battery pack design such as that of FIG. 5 using the present approach, as compared with the best prior approaches.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A battery system, comprising:
   a battery cell having a battery cell housing;
   a housing support external to the battery cell housing, the housing support comprising at least two split shell segments, each split shell segment including
   a heat-conductor inner layer comprising a plurality of heat-conducting fibers, each of the heat-conducting fibers having a sink end thereof, and
   a structural support outer layer overlying the heat conductor inner layer, the structural support layer being made of a fiber-reinforced composite material;
   a layer of a structural adhesive bonding the respective heat conductor inner layer of each split shell segment to the battery cell housing; and
   a thermal sink in thermal contact with the sink ends of the plurality of heat-conducting fibers of each of the split shell segments.

2. The battery system of claim 1, further including
a structural base to which the structural support outer layer of each split shell segment is joined.

3. The battery system of claim 1, wherein the heat-conducting fibers are made of high-thermal-conductivity graphite.

4. The battery system of claim 1, wherein the structural support outer layer of each split shell segment comprises a layer of a graphite-fiber-reinforced nonmetallic matrix.

5. The battery system of claim 1, wherein the battery cell has a generally cylindrical housing with a cylindrical axis, wherein the heat-conducting fibers are oriented substantially parallel to the cylindrical axis, and wherein the thermal sink is located at a first end of the generally cylindrical housing of the battery cell.

6. The battery system of claim 5, further including a structural base to which the structural support layer is joined, the structural base being disposed at a second end of the cylindrical housing of the battery cell.

7. A battery system, comprising:
a battery cell having a generally cylindrical battery cell housing with a cylindrical axis and a cylindrical external surface;
a housing support external to the cylindrical housing, the housing support comprising at least two split shell segments, each of the split shell segments including
a heat-conductor inner layer comprising a plurality of heat-conducting fibers aligned substantially parallel to the cylindrical axis of the battery cell housing, each of the heat-conducting fibers being made of high-thermal-conductivity graphite and having a sink end thereof, and
a structural support outer layer overlying the plurality of heat-conducting fibers, the structural support outer layer being made of a graphite fiber-reinforced composite material;
a layer of a structural adhesive bonding the heat conductor inner layer of each split shell segment to the battery cell housing; and
a thermal sink in thermal contact with the sink ends of the plurality of heat-conducting fibers, the thermal sink being disposed at a first end of the battery cell housing.

8. The battery system of claim 7, wherein the thermal sink comprises a graphite-composite radiator.

9. The battery system of claim 7, wherein the structural support outer layer of each split shell segment comprises a graphite-fiber-reinforced polymeric matrix.

10. The battery system of claim 7, further including
a structural base to which the structural support outer layer of each split shell segment is joined, the structural base being disposed at a second end of the battery cell housing.

11. A battery system, comprising:
a plurality of battery cells, each of the battery cells having a battery cell housing;
a respective housing support external to and overlying each battery cell housing, each housing support comprising at least two split shell segments, each split shell segment including
a heat conductor inner layer comprising a plurality of heat-conducting fibers, each of the heat-conducting fibers having a sink end thereof, and
a structural support outer layer overlying the heat conductor inner layer, the structural support layer being made of a fiber-reinforced composite material;
a layer of a structural adhesive bonding the heat conductor inner layer of each respective split shell segment to its battery cell housing;
a thermal sink in thermal contact with the sink ends of the plurality of heat-conducting fibers of each of the housing supports; and
a structural base to which the structural support outer layer of each of the housing supports is joined.

12. The battery system of claim 11, wherein the heat-conducting fibers are made of high-thermal-conductivity graphite.

13. The battery system of claim 11, wherein the structural support outer layer comprises a layer of a graphite-fiber-reinforced nonmetallic matrix.

14. The battery system of claim 11, wherein each battery cell housing is generally cylindrical with a cylindrical axis, wherein the heat-conducting fibers are oriented substantially parallel to the cylindrical axis, and wherein the thermal sink is located at a first end of the battery cell housing.

15. The battery system of claim 14, wherein the structural base is disposed at a second end of the battery cell housing.

16. A method for preparing a battery system, comprising the steps of
furnishing a battery cell having a generally cylindrical battery cell housing with a cylindrical axis and a cylindrical external surface;
furnishing a mandrel having a mandrel cylindrical axis and a generally cylindrical mandrel surface of substantially the same diameter as the battery cell housing;
assembling a housing shell over the mandrel, the step of assembling including the steps of
applying a heat-conductor inner layer overlying the cylindrical mandrel surface, the heat-conductor inner layer comprising a plurality of heat-conducting fibers aligned generally parallel to the mandrel cylindrical axis, the heat-conducting fibers being made of high-thermal-conductivity graphite and having a sink end thereof,
applying a structural support outer layer overlying the plurality of heat-conducting fibers, the structural support outer layer being made of a fiber-reinforced composite material, and
curing the heat-conductor inner layer and structural support outer layer in place on the mandrel;
splitting the housing shell parallel to the mandrel cylindrical axis at two circumferential locations to form two split shell segments, and removing the split shell segments from the mandrel;
supplying a structural adhesive;
attaching each split shell segment to the battery cell housing using the structural adhesive; and
affixing the sink ends of the heat-conducting fibers of each of the split shell segments to a thermal sink, the thermal sink being disposed at a first end of the battery cell housing.

17. The method of claim 16, including an additional step, after the step of attaching, of
affixing the structural support outer layer of each of the split shell segments to a structural base.

* * * * *